United States Patent [19]

Himeshima et al.

[11] Patent Number: 6,039,892

[45] Date of Patent: Mar. 21, 2000

[54] OXYGEN ABSORBENT COMPOSITION

[75] Inventors: Tomoharu Himeshima, Chiba-ken; Kazumoto Nakagawa; Tatsuo Iwai, both of Tokyo; Takayuki Watanabe, Chiba-ken, all of Japan

[73] Assignee: Mitsubishi Gas Chemical Company, Inc., Tokyo, Japan

[21] Appl. No.: 09/246,844

[22] Filed: Feb. 9, 1999

[30] Foreign Application Priority Data

Feb. 18, 1998 [JP] Japan .................................. 10-035988

[51] Int. Cl.⁷ .......................... C09K 15/04; C09K 15/26; B01J 19/00
[52] U.S. Cl. ........................ 252/188.28; 252/384; 422/40
[58] Field of Search .............................. 252/188.28, 384; 422/40

[56] References Cited

U.S. PATENT DOCUMENTS

| | | | |
|---|---|---|---|
| 4,517,111 | 5/1985 | Dorman et al. | 252/186.25 |
| 4,908,151 | 3/1990 | Inoue et al. | 252/188.28 |
| 5,060,672 | 10/1991 | Immi et al. | 131/331 |
| 5,286,407 | 2/1994 | Inoue et al. | 252/188.28 |
| 5,413,827 | 5/1995 | Brodie, III et al. | 428/35.7 |
| 5,853,662 | 12/1998 | Watanabe et al. | 422/40 |
| 5,866,070 | 2/1999 | Watanabe et al. | 422/40 |

FOREIGN PATENT DOCUMENTS

| | | |
|---|---|---|
| 9732924A | 9/1997 | European Pat. Off. . |
| 07941132A | 9/1997 | WIPO . |

OTHER PUBLICATIONS

Abstract of JP6–161045, Week 9427, Derwent Publications Ltd., Jun. 7, 1994.
Abstract of JP2–180634, Week 9034, Derwent Publications Ltd., Jul. 13, 1990.
Abstract of JP60–132645, Week 8534, Derwent Publications Ltd., Jul 13, 1985.

*Primary Examiner*—Joseph D. Anthony
*Attorney, Agent, or Firm*—Antonelli, Terry, Stout, Kraus, LLP

[57] ABSTRACT

There is disclosed herein an oxygen absorbent composition comprising an organic oxygen absorbent (A) which neither absorbs nor releases moisture and in which an oxidizable main component is supported on a porous silicate having an average pore diameter of 200 to 5,000 Å, and a formaldehyde absorbent (B) which neither absorbs nor releases moisture and is at least one of an amine, a thiol and a sulfonic acid that is supported on a porous carrier. According to this invention cultural assets made of organic materials which are required to be kept in a medial humidity atmosphere can be preserved in an atmosphere of a medial humidity, a low oxygen concentration and a low formaldehyde concentration by the use of the disclosed oxygen absorbent composition.

8 Claims, No Drawings

OXYGEN ABSORBENT COMPOSITION

BACKGROUND OF THE INVENTION

1. Field of the Invention

The present invention relates to an oxygen absorbent composition, and more specifically, it relates to an oxygen absorbent composition which can be used to preserve cultural assets, for example, wooden sculptures such as lacquered containers and statues, painted plates, wooden buildings, horns such as carved horns, industrial art objects using bones, fabrics and dyes fabrics of silk, cotton, hemp and the like, paper materials such as secondhand books, second-hand documents, Japanese papers, books, sacred books, documents and scrolls, paintings such as oil paintings, watercolor paintings, Japanese paintings and calligraphic works, ambers, various dyes and pigments, specimens of insects and plants, leathers, photographs such as photo-graphic negative films, printed photographs, microfilms and slides, and strings of musical instruments which are made of organic materials and which tend to bring about strength deterioration, discoloration and fade-out by oxidation and which tend to suffer from damage by insects such as grain weevils.

2. Description of the Related Art

Cultural assets made of organic materials are desirably preserved at a medial humidity and under conditions that the humidity scarcely changes. Therefore, it has usually been carried out to preserve the cultural assets in a room or a warehouse in which a temperature is adjusted to about 20 to 25° C. and a relative humidity is adjusted to about 30 to 50% mechanically by an air-conditioning equipment. In addition, it has also be done to further positively keep the humidity at a constant level by the use of a humectant and a humidifying box. In any case, however, oxygen is not removed from a preservative environment, and hence, the value of the cultural assets has actually been lost owing to discoloration and deterioration by reactions with oxygen and owing to the propagation of microorganisms such as molds. Moreover, fumigation has also been employed for the killing of insects by the use of methyl bromide, but the warehouse is stuffy with methyl bromide for a long time, which is definitely harmful to operators.

Furthermore, in a certain case, an oxygen absorbent has been utilized for the preservation of the cultural assets made of the organic materials. In the conventional oxygen absorbents, however, there is used, as an oxidizable main component, a composition comprising iron or an iron powder such as iron carbide and an electrolyte such as a metal halide, a reducing inorganic salt such as a sulfite, a thiosulfate or a ferrous salt, a polyphenol such as hydroquinone, catechol, resorcin or pyrogallol, a reducing saccharide such as glucose, a reducing polyhydric alcohol such as ascorbic acid or erysorbic acid, or a reducing agent such as glycerin. However, all of them require moisture in an oxygen absorbing reaction, and the oxygen absorbent composition itself contains the moisture. Hence, the humidity in a closed container rises, and in consequence, the moisture is inconveniently given to the articles to be preserved. When the oxygen absorbent composition itself does not contain the moisture, the moisture is taken from the closed atmosphere, and an oxygen absorption rate is affected by the humidity of the closed atmosphere, so that the oxygen absorption rate becomes slow. For these reasons, the performance of the oxygen absorbent composition inconveniently becomes unstable.

As a technique for removing oxygen while the humidity is maintained at a medial level, Japanese Patent Application Laid-Open No. 96060/1992 discloses a method in which a gas barrier bag is filled with an oxygen absorbent composition comprising an unsaturated aliphatic compound, an oxygen absorbent comprising a substance for accelerating an oxygen absorption and a humectant, and it is used for the preservation of photographs. In addition, Japanese Patent Application Laid-Open No. 100537/1992 discloses a method in which secondhand books, secondhand documents, magnetic tapes and drugs are preserved by such a method. The other similar methods are also disclosed in U.S. Pat. No. 5,286,407 and Japanese Patent Application Laid-Open Nos. 6287/1992, 29741/1992, 87961/1992, 239092/1992 and 268085/1992. In addition, it is disclosed in U.S. Pat. No. 4,908,151 and Japanese Patent Application Laid-Open Nos. 198962/1988 and 67252/1989 that dry foods and drugs are preserved and metallic products are prevented from rusting by the use of an oxygen absorbent composition comprising an unsaturated fatty acid, a transition metal, a basic substance and an oxygen absorbent.

However, it has been elucidated that when the oxygen absorbent compositions which are employed in these publications are used, formaldehyde and the like are generated by the oxygen absorbing reaction, as described in comparative examples which will be given hereinafter in this specification. For example, if formaldehyde is present, litharge (lead monoxide) which is a kind of pigment is reduced, so that yellow color is changed into white color. As understood from this example, formaldehyde and the like generated during the oxygen absorption are reactive, and they discolor some kinds of dyes and pigments. Accordingly, the oxygen absorbent compositions disclosed in these publications are scarcely useful as the oxygen absorbents for the preservation of the cultural assets made of the organic materials.

Furthermore, in these publications, perlites, activated carbons and zeolites are enumerated as adsorbents in the oxygen absorbent compositions. Moreover, as materials for absorbing substances produced by decomposition during the oxygen absorption of the unsaturated aliphatic compound, there are exemplified basic substances such as amine compounds, magnesium oxide, calcium oxide and calcium hydroxide. However, even if the perlite or the zeolite is used to adsorb a reactive gas such as formaldehyde, in the medial humidity atmosphere, adsorption sites are first covered with molecules of the moisture, so that the reactive gas cannot effectively be adsorbed. The activated carbon effectively functions even in the relatively medial humidity atmosphere, but its ability to adsorb formaldehyde is low. Therefore, a large amount of the activated carbon is disadvantageously required. On the other hand, magnesium oxide, calcium oxide and calcium hydroxide cannot effectively absorb the reactive gas, as shown in the undermentioned comparative examples. Additionally, in these publications, the amine compounds are enumerated as the basic substances, but the suitable kinds of amine compounds are not concretely exemplified at all. When some amine compounds were merely used as they are by the inventors of the present application, any effect was not observed.

Furthermore, since these disclosed techniques are used in the medial humidity atmosphere, they suggest the employment of the humectant. However, if the humectant is actually used, the volume of the oxygen absorbent composition itself correspondingly increases. Thus, if no use of the humectant is allowed, such a constitution is preferable. In the above publications, examples of a carrier for the oxidizable main component include papers, unwoven fabrics, perlites, activated carbons and zeolites, but when the oxidizable main component is supported on the paper and the unwoven fabric, they becomes sticky, and hence they are not practical. When the oxidizable main component is supported on the activated carbon, its reactivity with oxygen is too high, so that deactivation is liable to occur in air. In addition, a large quantity of heat is generated, and for these reasons, the handling of the activated carbon is inconvenient and hence it is not preferable. The perlite and the zeolite themselves have a moisture absorption ability, and so they decrease the humidity in the closed system. Hence, the humectant must be used unavoidably.

SUMMARY OF THE INVENTION

The present invention intends to provide an oxygen absorbent composition, which is placed in a gas barrier container together with an article to be preserved, and the container is then sealed, whereby the composition maintains a medial humidity atmosphere equivalent to a moisture content of the article to be preserved without giving the moisture to and taking the moisture from the article to be preserved in the sealed container. In addition, a reactive gas such as formaldehyde generated with an oxygen absorbing reaction might have a bad influence on cultural assets made of organic materials, and the present invention also intends to provide an oxygen absorbent composition having an ability to absorb such a reactive gas.

The present inventors have intensively researched on techniques of preserving the cultural assets made of the organic materials. As a result, it has been found that the removal of oxygen from a sealed system is effective for the preservation of the cultural assets made of the organic materials, but a conventional oxygen absorber which absorbs and releases the moisture cannot maintain the medial humidity atmosphere and badly influences the cultural assets made of the organic materials, and therefore it is necessary to select an organic oxygen absorbent which neither absorbs nor releases the moisture. Moreover, formaldehyde generated with the oxygen absorbing reaction of the organic oxygen absorbent brings about a chemical reaction with the cultural assets made of the organic materials and badly affects them. Therefore, it has been found that when a formaldehyde absorbent is additionally simultaneously used, an oxygen absorbent composition suitable for the preservation of the cultural assets made of the organic materials can be obtained. The present invention has been completed on the basis of such a knowledge.

That is to say, the present invention is directed to an oxygen absorbent composition which comprises an organic oxygen absorbent (A) which neither absorbs nor releases moisture and a formaldehyde absorbent (B) which neither absorbs nor releases the moisture. Here, an oxidizable main component of the organic oxygen absorbent (A) is preferably an unsaturated fatty acid compound and/or a chain hydrocarbon polymer having an unsaturated group, and particularly preferably, the oxidizable main component is supported on a porous silicate having an average pore diameter of 200 to 5,000 Å. Furthermore, this porous silicate is particularly preferably at least one selected from the group consisting of diatomaceous earth, Kanuma pumice bed soil (hereinafter referred to as "Kanuma soil") and sepiolite.

Formaldehyde generated with the oxygen absorbing reaction is sufficiently adsorbed by an absorbent such as zeolite during drying, but in the medial humidity atmosphere in which the cultural assets made of the organic materials are preserved, the absorption of formaldehyde is disturbed by the molecules of the moisture, so that it is not sufficiently adsorbed. In order to effectively absorb formaldehyde even in the medial humidity atmosphere, it is desirable that the formaldehyde absorbent (B) has an ability to absorb the gas of formaldehyde irrespective of a relative humidity and the formaldehyde absorbent (B) comprises a porous material on which at least one of an amine, a thiol and a sulfonic acid is supported. The amine, the thiol or the sulfonic acid is preferably solid at −10° C. to 50° C., and more preferably, the amine, the thiol or the sulfonic acid is at least one selected from the group consisting of 4B acid (2-amino-5-methylbenzenesulfonic acid), metanillic acid (m-aminobenzenesulfonic acid), 2B acid (4-amino-2-chlorotoluene-5-sulfonic acid), naphthionic acid (1-naphthylamine-4-sulfonic acid), Tobias acid (2-aminonaphthalene-1-sulfonic acid), sulfanilic acid (4-aminobenzenesulfonic acid), C acid (3-amino-6-chlorotoluene-4-sulfonic acid), G acid (7-hydroxynaphthalenesulfonic acid), J acid (2-amino-5-naphthol-7-sulfonic acid), γ-acid (6-amino-4-hydroxy-2-naphthalenesulfonic acid), H acid (4-amino-5-hydroxy-2,7-naphthalenesulfonic acid) and R acid (2-naphthol-3,6-disulfonic acid) which have both of an amino group and a sulfonic group in a molecule, and cystine having both of the amino group and a mercapto group. Moreover, the amine, the thiol or the sulfonic acid is preferably supported on a porous silicate having an average pore diameter of 200 to 5,000 Å, and more preferably, this porous silicate is at least one selected from the group consisting of diatomaceous earth, Kanuma soil and sepiolite.

DESCRIPTION OF THE PREFERRED EMBODIMENTS

An organic oxygen absorbent (A) which can be used in the present invention is preferably an absorbent which neither absorbs nor releases moisture, does not require the moisture for the absorption of oxygen, and can stably absorb oxygen irrespective of a relative humidity. In this specification, "neither absorbs nor releases the moisture" does not mean that the moisture is neither released from nor adsorbed on the absorbent at all, but that for example, when the absorbent is placed in a sealed container having a temperature of 20° C. and a relative humidity of 40%, the moisture is absorbed on and released from the surface of the absorbent, but in an equilibrium state, the humidity in the sealed container is maintained at about 40%.

Examples of an oxidizable main component of the organic oxygen absorbent (A) which can be used in the present invention include unsaturated organic compounds such as unsaturated fatty acid compounds and chain hydrocarbon polymers having an unsaturated group, and thermoplastic polymers such as polyamides and polyolefins. Usually, in order to obtain a practical oxygen absorption rate, it is preferred that the organic oxygen absorbent (A) is incorporated with an oxygen absorption accelerator such as a salt of a transition metal. Above all, preferable is the organic oxygen absorbent which comprises the unsaturated fatty acid compound or the chain hydrocarbon polymer having the unsaturated group as the oxidizable main component and the oxygen absorption accelerator.

Examples of the unsaturated fatty acid compound which can be used in the present invention include unsaturated fatty acids having 10 or more carbon atoms and a double bond between carbon atoms as well as salts and esters of the unsaturated fatty acids. The unsaturated fatty acids as well as the salts and the esters of these fatty acids may each have a substituent such as a hydroxyl group or a formyl group. The unsaturated fatty acid compound does not always have to be a pure substance, and a mixture such as a natural substance may also be used. Examples of the unsaturated fatty acid compound include unsaturated fatty acids such as oleic acid, linoleic acid, linolenic acid, arachidonic acid, parinaric acid, dimer acid and ricinoleic acid; oils such as linseed oil, soybean oil, China wood oil, rice bran oil, sesame oil, cotton seed oil, rape seed oil and tall oil which contain esters of the above unsaturated fatty acids; and esters and metallic salts of the unsaturated fatty acids. In addition, examples of the unsaturated fatty acids include fatty acids obtained from vegetable oils and animal oils such as linseed oil fatty acids, soybean oil fatty acids, China wood oil fatty acids, rice bran oil fatty acids, sesame oil fatty acids, cotton seed oil fatty acids, rape seed oil fatty acids and tall oil fatty acids.

Furthermore, the chain hydrocarbon polymer having the unsaturated group which can be used in the present invention include liquid oligomers such as liquid butadiene oligomer, liquid isoprene oligomer, liquid acetylene oligomer, liquid styrene-butadiene copolymer, liquid acrylonitrile-butadiene copolymer, liquid chloroprene oligomer, liquid unsaturated polyester resin and natural rubbers. These liquid oligomers may be used singly, in the form of a mixture of two or more thereof, or in the form of a copolymer thereof. A small amount of impurities such as a solvent and the like which are entrained during a manufacturing process is allowable, so long as this amount is within a usual acceptable range. The chain hydrocarbon polymer having the unsaturated group which can be used in the present invention may have another substituent such as a halogen group, a hydroxyl group, a carbonyl group, an ether group, a carboxyl group or an ester group in addition to the unsaturated group. For example, the chain hydrocarbon polymer may be substituted with any of functional groups such as an alicyclic hydrocarbon group, an aromatic hydrocarbon group, a hydroperoxy group, an epoxy group, an oxo group, a hydroxymethyl group, an acyl group, an amino group, an imino group, a nitrilo group, a nitro group, a nitroso group, an amide group, an imide group, a cyano group, an isocyano group, a cyanato group, an isocyanato group, a diazo group, an azide group, a hydrazino group, an azo group and a heterocyclic group.

Examples of the preferable oxygen absorption accelerator which can be mixed with the oxidizable main component include metallic compounds for accelerating the oxidation of the organic compound and radical initiators. Examples of the preferable metallic compounds include salts of transition metals such as Cu, Fe, Co, Ni, Cr, Mn and Zn, and in view of an oxygen absorbing performance and safety, the salts of the transition metals of Mn and Fe are more preferable. Examples of the suitably usable salts of the transition metals include inorganic salts such as sulfates, chlorides and nitrates, organic salts such as salts of fatty acids and metallic salts of acetylacetone, and alkyl metal compounds. Examples of the radical initiators include catechols, azo compounds such as 2,2-azobisisobutyronitrile, and peroxides such as benzoyl peroxide. When the oxidizable main component simultaneously has a function as the oxygen absorption accelerator, it is not necessary to particularly add the oxygen absorption accelerator.

In order to accelerate an oxygen absorption rate and to enhance handling properties, it is preferred that a porous material is impregnated with the oxidizable main component including the oxygen absorption accelerator which can be used in the present invention. In general, the porous material which is impregnated with the oxidizable main component of the oxygen absorbent preferably has a high impregnation ratio and a large pore volume which permits the impregnation of the oxidizable main component in the largest possible amount, and in order to accelerate the oxygen absorption rate, the porous material is required to possess a suitable specific surface area.

In the case that the porous material which absorbs the moisture is used in the present invention, this porous material absorbs the moisture from a preservation environment in a sealed container, which inconveniently leads to the drop in a humidity, and it takes the moisture from articles to be preserved, which inconveniently leads to the change in physical properties such as the deterioration of the strength of the articles to be preserved and the occurrence of a peeling phenomenon. Therefore, it is necessary to select the porous material which does not absorb any moisture. There are various kinds of porous materials, but examples of the porous materials which are usually available at low costs include activated carbons such as activated carbon and bone charcoal, and silicates such as zeolite, silica gel, mordenite and activated China clay. Since the fundamental constitutional element of the activated carbon is carbon, it is usually non-polar and has a hydrophobic surface. Therefore, the activated carbon scarcely absorb the moisture at a relative humidity of 40% or less. However, when the relative humidity is more than 40%, the activated carbon begins to absorb the moisture by capillarity. As an impregnation carrier for the oxidizable main component in the present invention, the activated carbon is not preferable, because it has a large specific surface area of hundreds $m^2/g$ or more and so it is easily deactivated by a reaction with oxygen, and it also generates a large quantity of heat and hence its handling in air is inconvenient, though it is excellent in that it does not adsorb the moisture.

On the other hand, the silicate which is represented by a general formula $xM_2O.ySiO_2$ adsorbs the moisture, which is a polar molecule, more easily than the activated carbon. Therefore, the silicate adsorbs the moisture and conversely releases the adsorbed moisture in accordance with the change in a temperature and a relative humidity, and if a large amount of the moisture is absorbed or released, it is difficult to stably maintain the humidity at the medial level in the sealed container. The diameter of the moisture molecule is 2.8 Å, and the pore diameter of the porous silicate is close to this level. For example, in zeolite (to 10 Å), silica gel (10 to 200 Å), alumina gel (40 to 400 Å) and activated China clay (20 to 300 Å), a hygroscopicity and the amount of the absorbed moisture vary in accordance with each composition and pore structure, but the adsorbed moisture in the pores is scarcely released and so these porous silicates are considered to have a moisture absorbing performance. Accordingly, a porous material, among the porous silicates, having an average pore diameter of 200 to 5,000 Å in the vicinity of the so-called macropore (500 Å or more) which scarcely adsorb the moisture (a moisture absorption ratio at 20° C. and at a relative humidity of 40% is 5% by weight or less) is preferably impregnated with the oxidizable main component including the oxygen absorption accelerator which can be used in the present invention. In the case that the average pore diameter of the porous silicate is more than the above range, the impregnation of the oxidizable main component is not sufficient, so that it might ooze out, which might cause a handling trouble on occasion inconveniently. In the case that the average pore diameter is less than the above range, the pores of the so-called micropore (20 Å or less) and mesopore (20 to 500 Å) are present in a main ratio, so that a tendency to strongly adsorb the moisture increases inconveniently. Examples of the porous silicates having an average pore diameter of 200 to 5,000 Å include diatomaceous earth, cristobalite, Kanuma soil, andosoil (a kind of volcanic ash soil), bora, allophane such as pumice stone, sepiolite and porous glasses, but above all, preferable are diatomaceous earth, Kanuma soil and sepiolite which have a relatively large pore volume and which can be impregnated with a large amount of the oxidizable main component. A carrier material obtained by calcining the above preferable porous material at about 800° C., which is lower than a sintering temperature, is more preferable, because the strength of the thus obtained carrier material is increased, and the micropores of the carrier material are crushed to inhibit the absorption of the moisture without altering the impregnation ratio of the oxidizable main component.

In the oxygen absorbent composition of the present invention in which the unsaturated fatty acid compound or the chain hydrocarbon polymer having the unsaturated group is used as the oxidizable main component, the ratio of the respective components is such that the ratio of the oxygen absorption accelerator is in the range of 0.01 to 40 parts by weight, preferably 0.05 to 30 parts by weight, more preferably 0.1 to 10 parts by weight with respect to 100 parts by weight of the oxidizable main component. The ratio of the porous material which is the carrier is in the range of 1 to 1000 parts by weight, preferably 10 to 700 parts by weight, more preferably 100 to 400 parts by weight with respect to 100 parts by weight of the oxidizable main component.

The formaldehyde absorbent (B) of the present invention is an essential component as the oxygen absorbent for the cultural assets made of the organic materials in the case that the organic oxygen absorbent is used. According to an intensive research by the present inventors, it has been found that the organic oxygen absorbent utilizes the oxidative reaction of the organic material which is the oxidizable main component, but this oxidizable main component decomposes with the oxidative reaction, so that lower aldehydes such as formaldehyde, acetaldehyde and acetic acid as well as lower carboxylic acids are produced in many reaction products. These compounds are highly reactive, and particularly, formaldehyde has a high reducibility, so that even if it is present in a trace amount, it reacts with a pigment component of the cultural assets made of the organic materials, whereby their value is reduced. Accordingly, the organic oxygen absorbent is required to be used together with the absorbent having an ability to absorb formaldehyde and the like. However, since the cultural assets made of the organic materials are preserved in the medial humidity atmosphere, it is necessary that this absorbent should neither absorb nor release the moisture and its absorption ability should not be affected in the medial humidity atmosphere. Zeolite which is one of the typical gas absorbents can exert the strong formaldehyde absorbing ability in a dry state, but in the medial humidity atmosphere, it cannot exhibit such an ability, because adsorption sites are covered with the molecules of water, so that the absorption ability is lost. Therefore, there has been required the absorbent which can absorb lower aldehyde gases of $C_1$ to $C_{12}$ to a level of 0.05 ppm or less and can absorb lower carboxylic acid gases of $C_1$ to $C_9$ to a level of 0.05 ppm or less irrespective of the relative humidity. The relevant formaldehyde absorbent (B) is preferably a porous material on which at least one of an amine, a thiol and a sulfonic acid is supported.

The amine, the thiol or the sulfonic acid which is liquid in the vicinity of ordinary temperature actually used in the present invention has a higher vapor pressure than in the case of a solid. Hence, the sealed container might be filled with the vaporized substance, and this substance might inversely have a bad influence on the articles to be preserved. In view of the foregoing, such a substance (i.e., the amine, the thiol or the sulfonic acid) is preferably solid in the vicinity of ordinary temperature of −10 to 50° C.

Examples of the amine include urea compounds such as urea, thiourea and ethylene urea, hydrazine compounds, dicyandiazides and acid salts thereof, hydroxyamines such as hydroxyamine hydrochloride and hydroxylamine sulfate, guanidine salts such as guanidine phosphate, guanidine sulfamate and aminoguanidine hydrochloride, an ammonium salt such as ammonium sulfate, an aminoalcohol such as ethanolamine, phenylamines such as aminophenol, phenylethylamine and phenylethanolamine, a catecholamine such as dopamine, an indolamine such as serotonin, imidazoles such as 2-methylimidazole and 4-methylimidazole, a polyamine such as putrescine, aminobenzoic acids, aminobenzenes, aminomethylene, melamine, morpholine, aniline and phenylenediamine. Examples of the thiol include alkylmercaptans, thioglycol acid salts, thioglycerol, thiosalicylic acid and thiophenol. Examples of the sulfonic acid include sulfolane, sulfamic acid, thiosulfates, hypochlorites, sulfites, bisulfites, phenolsulfonic acids and NW acid (4-hydroxy-1-naphthalenesulfonic acid).

Among the amine, the thiol and the sulfonic acid which can be used in the present invention, more preferable are 4B acid (2-amino-5-methylbenzenesulfonic acid), metanillic acid (m-aminobenzenesulfonic acid), 2B acid (4-amino-2-chlorotoluene-5-sulfonic acid), naphthionic acid (1-naphthylamine-4-sulfonic acid), Tobias acid (2-aminonaphthalene-1-sulfonic acid), sulfanilic acid (4-aminobenzenesulfonic acid), C acid (3-amino-6-chlorotoluene-4-sulfonic acid), G acid (7-hydroxynaphthalenesulfonic acid), J acid (2-amino-5-naphthol-7-sulfonic acid), γ-acid (6-amino- 4-hydroxy-2-naphthalenesulfonic acid), H acid (4-amino-5-hydroxy-2,7-naphthalenesulfonic acid), R acid (2-naphthol-3,6-disulfonic acid) and guanidine sulfamate which have both of an amino group and a sulfonic group in a molecule, and cystine having both of the amino group and a mercapto group. These preferable examples have a strong ability to absorb the lower aldehydes or the lower carboxylic acids.

In order to accelerate the absorption rate and the handling properties of the formaldehyde absorbent (B) which can be used in the present invention, the amine, the thiol or the sulfonic acid is preferably supported on a porous material (I.e. carrier). In consideration of supporting the amine, the thiol or the sulfonic acid, this porous material preferably has a large specific surface area of 100 $m^2/g$ or more which permits taking a large contact area with target gases such as the lower aldehydes. Examples of the porous material include activated carbons such as activated carbon, activated carbon fiber, bone charcoal and molecular sieving carbon, and natural zeolites such as porous film, silica gel, porous glasses, alumina, zeolite, mordenite and erionite, and clay minerals such as pearlite and activated China clay.

However, the cultural assets made of the organic materials which are the articles to be preserved regarding the present invention are required to be preserved in the medial humidity atmosphere, and therefore, among the above examples, the porous material which absorbs the least possible moisture is preferable. Therefore, as the porous material on which the amine, the thiol or the sulfonic acid is supported, the above porous silicate having an average pore diameter of 200 to 5,000 Å is preferable, and examples of the porous silicate having an average pore diameter of 200 to 5,000 Å include diatomaceous earth, cristobalite, Kanuma soil, andosoil, bora, allophane such as pumice stone, sepiolite and porous glasses.

In contrast to the above organic oxygen absorbent (A), when the porous material for supporting the amine, the thiol or the sulfonic acid thereon is selected, it is unnecessary to consider the deactivation, the heat generation and the handling difficulty by the excessively high reactivity with oxygen. Therefore, there can also be used activated carbons such as activated carbon, activated carbon fiber, bone charcoal and molecular sieving carbon. The reason why these activated carbons are usable is that each of them has a hydrophobic surface and hence it scarcely absorbs the moisture at a relative humidity of 40% or less. When the relative humidity is more than 40%, they begin to absorb the moisture by capillarity, but the amount of the activated carbon to be used is smaller as compared with the volume of the articles to be preserved or the sealed container on occasion, and in practice, these activated carbons can sufficiently be used so long as the humidity is not in excess of the medial humidity level.

Supporting the component of the amine, the thiol or the sulfonic acid on the porous material can be accomplished by a usual method, and for example, in the case that the component is solid, its aqueous solution is first prepared, and if it is scarcely dissolved in water, it may be dissolved in an organic solvent such as methanol, ethanol or acetone. Afterward, the porous material is impregnated with the dissolved component, followed by mixing. The resultant mixture is dried at a temperature lower than the decomposition temperature, the evaporation temperature or the melting temperature of the component, preferably at a temperature of about 50 to 100° C., thereby supporting the component on the porous material. In the case that the component is liquid, it may be supported thereon as it is, or it may be diluted with an organic solvent and the porous material is then directly impregnated with the thus diluted component, followed by mixing, whereby the component can be supported on the porous material. Alternatively, the respective components may be ground, mixed, kneaded with water or an organic solvent such as an alcohol, molded, and then calcined.

The amount of the formaldehyde absorbent (B) to be used depends on the amount of the gas generated with the oxygen absorbing reaction, but it is usually in the range of 0.01 to 1000 parts by weight, preferably 0.1 to 700 parts by weight, more preferably 1 to 400 parts by weight with respect to 100 parts by weight of the oxidizable main component. A weight ratio between the amine, the thiol or the sulfonic acid which is the component to be supported and the porous material which is the carrier is such that the ratio of the component is in the range of 0.1 to 50 parts by weight, preferably 0.5 to 30 parts by weight with respective to 100 parts by weight of the carrier.

Preferably, a carbon dioxide gas absorbent is added to the oxygen absorbent composition of the present invention. The organic oxygen absorbent generates a carbon dioxide gas with the oxygen absorbing reaction, and since the atmosphere is in the medial humidity state, the gas badly functions as carbonic acid. Therefore, it is a practical strategy to use the carbon dioxide gas absorbent together. Examples of the carbon dioxide gas absorbent include hydroxides of alkali metals and alkaline earth metals such as sodium hydroxide, potassium hydroxide, magnesium hydroxide and slaked lime.

The organic oxygen absorbent (A) and the formaldehyde absorbent (B) regarding the present invention can suitably be used in the form of a powder, granules, tables or sheets as a single agent or as a mixture of both. It is not preferable that the oxygen absorbent composition of the present invention directly comes in contact with the articles to be preserved, and hence, prior to its use, the composition may be wrapped in an air-permeable wrapper fundamentally made of a paper, an unwoven fabric, a plastic or the like. The oxygen absorbent composition may be used as one kind of package or as different kinds of packages. The form of the package is not always limited, and it may be changed in compliance with a use purpose. For example, a sachet, a sheet and a blister package are acceptable. The package is preferably made of such a material as to inhibit the absorption and the release of the moisture as much as possible. Furthermore, for the protection of the package from dust, the package can be covered with a dust-free packaging material which neither impairs the permeability of oxygen, an inorganic gas, a carbon dioxide gas and an organic gas and nor releases the dust generated from the package to the outside, thereby constituting a double package. However, in the case that the package has a protective function against the dust by itself, it is not necessary to further cover the package with the dust-free packaging material.

In practice, the oxygen absorbent composition of the present invention is placed in the sealable container having high gas barrier properties together with the cultural assets to be preserved made of the organic materials. The highly airtight container referred to herein means a plastic container, a film bag, a metallic container or a glass container having such gas barrier properties that a water vapor permeability at 25° C. and a relative humidity of 60% is preferably 10 $cc/m^2$.day.atm or less and a water vapor permeability at 40° C. and a relative humidity of 90% is preferably 1 $g/m^2$.day or less. Above all, the film bag having the gas barrier properties is particularly preferable, and examples of the preferable film bag include bags of a film obtained by laminating a metallic foil such as aluminum foil, and a laminated film obtained by vapor-depositing silicon oxide or aluminum oxide.

As described above, according to the present invention, when the cultural assets made of the organic materials are placed in a gas barrier container together with an oxygen absorbent composition comprising an organic oxygen absorbent (A) and a formaldehyde absorbent (B) which neither absorb nor release moisture and the container is then sealed, a medial humidity atmosphere can be maintained in the sealed container, and oxygen can stably be absorbed without giving and taking the moisture to and from the articles to be preserved, while formaldehyde generated with an oxygen absorbing reaction is absorbed, whereby the cultural assets made of the organic materials which are required to be maintained in the medial moisture atmosphere can be preserved in the atmosphere of a medial humidity, a low oxygen concentration and a low formaldehyde concentration.

Next, the present invention will be described in more detail in accordance with examples. Incidentally, the scope of the present invention should not be limited to these examples at all.

EXAMPLE 1

90 g of soybean oil as an oxidizable main component and 400 ml of water at 90° C. were added to 230 g of a 10% aqueous sodium hydroxide solution, followed by saponification, thereby obtaining an aqueous soybean oil fatty acid sodium solution. To this solution, 270 g of a 10% aqueous ferric chloride solution was added, and an aqueous layer was then separated. An oil layer was washed with 500 ml of warm water three times to obtain 90 g of soybean oil fatty acid iron. 2.0 g of diatomaceous earth (average pore diameter=1,000 Å) was impregnated with 1 g of the thus obtained soybean oil fatty acid iron, followed by mixing, thereby preparing an organic oxygen absorbent (A). Next, 2.0 g of sepiolite calcined at 800° C. was impregnated with 1.0 g of a 15% aqueous sodium sulfanilate solution at 70° C., followed by mixing. Afterward, the mixture was dried at 120° C. to prepare a formaldehyde absorbent (B).

3.0 g of the above organic oxygen absorbent (A) and 2.15 g of the formaldehyde absorbent (B) were filled into a sachet of a permeable packaging material (paper/perforated polyethylene, internal size=45 mm×100 mm), and this sachet was then heat-sealed along its periphery to prepare a package. This package was placed together with 500 ml of air at 20° C. and a relative humidity of 40% in a laminated plastic film bag of a ceramic-deposited film (a gas barrier bag made by Mitsubishi Gas Chemical Company, Inc., trade name "PTS", size=220 mm×300 mm, hereinafter referred to as "the ceramic-deposited plastic film bag"), and this bag was then preserved at 20° C. and a relative humidity of 40%. After 2 weeks, an oxygen concentration and the relative humidity in the ceramic-deposited plastic film bag were analyzed by gas chromatography, and concentrations of formaldehyde, acetaldehyde and acetic acid were analyzed by a commercially available gas detecting tube. The obtained results are shown in Table 1. The relative humidity was still maintained at an initial value, and the oxygen concentration lowered to 0.1% or less and the concentrations of formaldehyde and the like were less than the lower limit of the detection. In Table 1, N.D. of the formaldehyde concentration means that the formaldehyde concentration is less than 0.05 ppm which is the lower limit of the detection, N.D. of the acetaldehyde concentration means that the acetaldehyde concentration is less than 0.2 ppm which is the lower limit, and N.D. of the acetic acid concentration means that the acetic acid concentration is less than 0.05 ppm which is the lower limit.

EXAMPLES 2 TO 16

The same procedure as in Example 1 was conducted except that an oxidizable main component, an oxygen absorption accelerator and a porous material for oxidizable main component impregnation of the organic oxygen absorbent (A) as well as a component to be supported and a porous material for component support of the formaldehyde absorbent (B) of Example 1 were replaced with materials shown in Tables 1 to 3. The results of Examples 2 to 16 are shown in Tables 1 to 3. In every example, a relative humidity was still maintained at an initial value, and an oxygen concentration lowered to 0.1% or less and a formaldehyde concentration was also less than the lower limit of detection.

In Example 2, there was used sepiolite (average pore diameter=250 Å) calcined at 800° C.

In Example 3, LPI means a liquid polyisoprene oligomer, and there was used cristobalite (average pore diameter=330 Å) calcined at 800° C.

In Example 4, "tall oil fatty acid/LPI was 0.6 g/0.4 g" means a mixture (weight ratio=6:4) of the tall oil fatty acid and the liquid polyisoprene oligomer, and there was used Kanuma soil (average pore diameter=2,000 Å) calcined at 800° C.

In Example 5, LPB means a liquid polybutadiene oligomer, and there was used a commercially available porous glass (average pore diameter=1,000 Å).

In Example 6, there was used andosoil (average pore diameter=1,000 Å) calcined at 800° C.

Cystine, morpholine, aniline and 1-thioglycerol are liquid at ordinary temperature and odorous, and hence, in Examples 7 to 10, 20 g of each of a commercially available particulate activated carbon, bone charcoal, activated carbon fiber and powdery activated carbon was directly impregnated with 0.15 g of each of the above components. The other procedures were the same as in Example 1.

Acetanilide is sparingly soluble in water, and hence, in Example 11, a 15 wt % ethanol solution of acetanilide was prepared, followed by impregnation. The other procedures were the same as in Example 1.

In Example 12, the same procedure as in Example 1 was conducted.

In Example 13, 5.0 g of diatomaceous earth was impregnated with 5 g of a 2.5 wt % aqueous melamine solution at 90° C. The other procedures were the same as in Example 1.

In Example 14, 1.0 g of diatomaceous earth was impregnated with 5 g of a 15 wt % salicylic acid acetone solution at 25° C. The other procedures were the same as in Example 1.

Sulfolane is liquid at ordinary temperature, and hence, in Example 15, 1.0 g of diatomaceous earth was directly impregnated with liquid sulfolane. The other procedures were the same as in Example 1.

In Example 16, the same procedure as in Example 1 was conducted.

EXAMPLE 17

The same procedure as in Example 1 was conducted except that 0.5 g of slaked lime was newly added as a carbon dioxide gas absorbent. The results are shown in Table 3. An oxygen concentration lowered to 0.1% or less while a relative humidity was maintained at an initial value, and concentrations of formaldehyde and the like were also less than the lower limit of detection.

EXAMPLE 18

The same procedure as in Example 1 was conducted except that 0.5 g of slaked lime was newly added as a carbon dioxide gas absorbent and 0.5 g of granular activated carbon was added as another additive. The results are shown in Table 3. An oxygen concentration lowered to 0.1% or less while a relative humidity was maintained at an initial value, and concentrations of formaldehyde and the like were also less than the lower limit of detection.

COMPARATIVE EXAMPLE 1

1.2 g of a 20 wt % aqueous sodium chloride solution were added to a mixture of 1.0 g of a reducing iron powder of 100 mesh and 1.0 g of a powdery activated carbon at 25° C., and a package of the resultant mixture was formed by the same procedures as in Example 1. This package was placed in a ceramic-deposited plastic film bag, and this bag was sealed and then preserved. After 2 weeks, the oxygen concentration and the relative humidity in the ceramic-deposited plastic film bag were analyzed. The results are shown in Table 4. The oxygen concentration lowered to 0.1% or less, but the relative humidity rose from an initial value of 40% to 75%.

COMPARATIVE EXAMPLE 2

The same procedure as in Example 1 was conducted except that a mixture of 1.0 g of a reducing iron powder of 100 mesh and 1.0 g of a powdery activated carbon was used. The results are shown in Table 4. An oxygen concentration merely lowered from 21% to 15%, and a relative humidity lowered from an initial value of 40% to 15%.

COMPARATIVE EXAMPLES 3 TO 5

The same procedure as in Example 1 was conducted except that a carrier to be impregnated with the organic oxygen absorbent (A) of Example 1 was changed from diatomaceous earth to each substance shown in Table 4 and a formaldehyde absorbent (B) was not added, thereby forming a package. This package was placed in a ceramic-deposited plastic film bag, and this bag was sealed and then preserved. After 2 weeks, the oxygen concentration and the relative humidity in the ceramic-deposited plastic film bag were analyzed by gas chromatography, and concentrations of formaldehyde, acetaldehyde and acetic acid were analyzed by a commercially available gas detecting tube. The obtained results are shown in Table 4.

In Comparative Example 3 in which 3.0 g of quick lime (20 to 48 mesh, which was not a porous substance and hence has no pores) was used as the impregnation carrier, the oxygen concentration lowered to 0.1% or less, but the relative humidity lowered from an initial value of 40% to 3%, and 5 ppm of formaldehyde, 500 ppm of acetaldehyde and 6 ppm of acetic acid were detected.

In Comparative Example 4 in which 3.0 g of zeolite (natural mordenite of 20 to 48 mesh) was used as the impregnation carrier, the oxygen concentration lowered to 0.1% or less, but the relative humidity lowered from an initial value of 40% to 20%, and 5 ppm of formaldehyde, 500 ppm of acetaldehyde and 6 ppm of acetic acid were detected.

In Comparative Example 5 in which 3.0 g of granular activated carbon (coconut shell activate carbon of 20 to 48 mesh) was used as the impregnation carrier, oxygen was absorbed in air in an impregnation step, so that heat was generated and hence an oxygen absorption ability was lost. In consequence, the oxygen concentration merely lowered to 18%.

COMPARATIVE EXAMPLE 6

The same procedure as in Example 1 was conducted except that a carrier to be impregnated with the organic oxygen absorbent (A) of Example 1 was changed from diatomaceous earth to 3.0 g of quick lime (20 to 48 mesh, which was not a porous substance and hence has no pores) and a formaldehyde absorbent (B) was not added and 1.5 g of silica gel impregnated with a mixture of 0.46 g of glycerin as a humectant and 0.04 g of water was added, thereby forming a package. This package was placed in a ceramic-deposited plastic film bag, and this bag was sealed and then preserved. After 2 weeks, the oxygen concentration and the relative humidity in the ceramic-deposited plastic film bag were analyzed by gas chromatography, and concentrations of formaldehyde, acetaldehyde and acetic acid were analyzed by a commercially available gas detecting tube. The obtained results are shown in Table 4. The oxygen concentration lowered to 0.1% or less, and the relative humidity was maintained at 35% which was about the same as an initial value, but 5 ppm of formaldehyde, 500 ppm of acetaldehyde and 6 ppm of acetic acid were detected.

COMPARATIVE EXAMPLES 7 TO 12

The same procedure as in Example 1 was conducted except that a carrier to be impregnated with the organic oxygen absorbent (A) of Example 1 was replaced with 3.0 g of quick lime (20 to 48 mesh, which was not a porous substance and hence has no pores) and each substance shown in Table 5 was added as a formaldehyde absorbent (B) and 1.5 g of silica gel impregnated with a mixture of 0.46 g of glycerin as a humectant and 0.04 g of water as in Comparative Example 6 was added, thereby forming a package. This package was placed in a ceramic-deposited plastic film bag, and this bag was sealed and then preserved. After 2 weeks, the oxygen concentration and the relative humidity in the ceramic-deposited plastic film bag were analyzed by gas chromatography, and concentrations of formaldehyde, acetaldehyde and acetic acid were analyzed by a commercially available gas detecting tube. The obtained results are shown in Table 5.

In Comparative Example 7 in which 2.0 g of granular activated carbon (coconut shell activate carbon of 20 to 48 mesh) was used as the formaldehyde absorbent (B), the oxygen concentration lowered to 0.1% or less, and the relative humidity was maintained at 35% which was about the same as an initial value, but 3 ppm of formaldehyde, 50 ppm of acetaldehyde and 5 ppm of acetic acid were detected.

In Comparative Example 8 in which 2.0 g of zeolite (natural mordenite of 20 to 48 mesh) was used as the formaldehyde absorbent (B), the oxygen concentration lowered to 0.1% or less, and the relative humidity was maintained at 35% which was about the same as an initial value, but 5 ppm of formaldehyde, 500 ppm of acetaldehyde and 6 ppm of acetic acid were detected.

In Comparative Example 9 in which 2.0 g of magnesium oxide (20 to 48 mesh) was used as the formaldehyde absorbent (B), the oxygen concentration lowered to 0.1% or less, and the relative humidity was maintained at 35% which was about the same as an initial value, but 5 ppm of formaldehyde, 500 ppm of acetaldehyde and 6 ppm of acetic acid were detected.

In Comparative Example 10 in which 2.0 g of quick lime (20 to 48 mesh) was used as the formaldehyde absorbent (B), the oxygen concentration lowered to 0.1% or less, and the relative humidity was maintained at 35% which was about the same as an initial value, but 5 ppm of formaldehyde, 500 ppm of acetaldehyde and 6 ppm of acetic acid were detected.

In Comparative Example 11 in which 2.0 g of slaked lime (20 to 48 mesh) was used as the formaldehyde absorbent (B), the oxygen concentration lowered to 0.1% or less, and the relative humidity was maintained at 35% which was about the same as an initial value, but 5 ppm of formaldehyde, 500 ppm of acetaldehyde and 6 ppm of acetic acid were detected.

In Comparative Example 12 in which 2.0 g of melamine (48 to 100 mesh) which was a kind of amine was used as the formaldehyde absorbent (B), the oxygen concentration lowered to 0.1% or less, and the relative humidity was maintained at 35% which was about the same as an initial valuer but 5 ppm of formaldehyde, 500 ppm of acetaldehyde and 6 ppm of acetic acid were detected.

COMPARATIVE EXAMPLE 13

The same procedure as in Example 1 was conducted except that the formaldehyde absorbent (B) in Example 1 was not added, thereby forming a package. This package was placed in a ceramic-deposited plastic film bag, and this bag was sealed and then preserved. After 2 weeks, the oxygen concentration and the relative humidity in the ceramic-deposited plastic film bag were analyzed by gas chromatography, and concentrations of formaldehyde, acetaldehyde and acetic acid were analyzed by a commercially available gas detecting tube. The obtained results are shown in Table 5. The oxygen concentration lowered to 0.1% or less, and the relative humidity was maintained at an initial value of 40%, but 5 ppm of formaldehyde, 500 ppm of acetaldehyde and 6 ppm of acetic acid were detected.

TABLE 1

|  | Example 1 | Example 2 | Example 3 |
|---|---|---|---|
| Organic Oxygen Absorbent (A) | | | |
| Oxidizable Main Component | Soybean Oil Fatty Acid Iron 1.0 g | Tall Oil Fatty Acid 1.0 g | LPI 1.0 g |
| Oxygen absorption Accelerator | — | Tall Oil Fatty Acid Cobalt 25 mg | Cobalt Naphthenate 25 mg |
| Porous Material for Supporting Oxidizable Main Component | Diatomaceous Earth 2.0 g | Sepiolite 2.0 g | Cristobalite 2.0 g |
| Formaldehyde Absorbent (B) | | | |
| Formaldehyde Absorbing Material | Sodium Sulfanilate 0.15 g | Sodium Naphthionate 0.15 g | Na Salt of 4B Acid 0.15 g |
| Porous Material for Supporting | Sepiolite 2.0 g | Sepiolite 2.0 g | Sepiolite 2.0 g |
| Gas concentration in Sealed Container (Preservation: 20° C. 40% RH) | | | |
| Oxygen | 0.1% | 0.1% | 0.1% |
| Relative Humidity (20° C.) | 40% | 40% | 40% |
| Formaldehyde | N.D. | N.D. | N.D. |
| Acetaldehyde | N.D. | N.D. | N.D. |
| Acetic acid | N.D. | N.D. | N.D. |

|  | Example 4 | Example 5 | Example 6 |
|---|---|---|---|
| Organic Oxygen Absorbent (A) | | | |
| Oxidizable Main Component | Tall Oil Fatty Acid/LPI 0.4 g/0.6 g | LPB 1.0 g | LPI/LPB 0.4 g/0.6 g |
| Oxygen Absorption Accelerator | Iron Naphthenate 25 mg | Tall Oil Fatty Acid Manganese 25 mg | Manganese Naphthenate 25 mg |
| Porous Material for Supporting Oxidizable Main Component | Kanuma Soil 2.0 g | Porous Glass 2.0 g | Andosoil 2.0 g |
| Formaldehyde Absorbent (B) | | | |
| Formaldehyde Absorbing Material | Sodium Metanillate 0.15 g | Na Salt of 2B Acid 0.15 g | Na Salt of Tobias Acid 0.15 g |
| Porous Material for Supporting | Sepiolite 2.0 g | Sepiolite 2.0 g | Sepiolite 2.0 g |
| Gas Concentration in Sealed Container (Preservation: 20° C. 40% RH) | | | |
| Oxygen | 0.1% | 0.1% | 0.1% |
| Relative Humidity (20° C.) | 40% | 40% | 40% |
| Formaldehyde | N.D. | N.D. | N.D. |
| Acetaldehyde | N.D. | N.D. | N.D. |
| Acetic acid | N.D. | N.D. | N.D. |

TABLE 2

|  | Example 7 | Example 8 | Example 9 |
|---|---|---|---|
| Organic Oxygen Absorbent (A) | | | |
| Oxidizable Main Component | Soybean Oil Fatty Acid Iron 1.0 g | Soybean Oil Fatty Acid Iron 1.0 g | Soybean Oil Fatty Acid Iron 1.0 g |
| Oxygen Absorption Accelerator | — | — | — |
| Porous Material for Supporting Oxidizable Main Component | Diatomaceous Earth 2.0 g | Diatomaceous Earth 2.0 g | Diatomaceous Earth 2.0 g |
| Formaldehyde Absorbent (B) | | | |
| Formaldehyde Absorbing Material | Cystine 0.15 g | Morpholine 0.15 g | Aniline 0.15 g |
| Porous Material for Supporting | Granular Activated Carbon 2.0 g | Bone Charcoal 2.0 g | Activated Carbon Fiber 2.0 g |
| Gas Concentration in Sealed Container (Preservation: 20° C. 40% RH) | | | |
| Oxygen | 0.1% | 0.1% | 0.1% |
| Relative Humidity (20° C.) | 40% | 40% | 40% |
| Formaldehyde | N.D. | N.D. | N.D. |
| Acetaldehyde | N.D. | N.D. | N.D. |
| Acetic acid | N.D. | N.D. | N.D. |

|  | Example 10 | Example 11 | Example 12 |
|---|---|---|---|
| Organic Oxygen Absorbent (A) | | | |
| Oxidizable Main Component | Soybean Oil Fatty Acid Iron 1.0 g | Soybean Oil Fatty Acid Iron 1.0 g | Soybean Oil Fatty Acid Iron 1.0 g |
| Oxygen Absorption Accelerator | — | — | — |
| Porous Material for Supporting Oxidizable Main Component | Diatomaceous Earth 2.0 g | Diatomaceous Earth 2.0 g | Diatomaceous Earth 2.0 g |
| Formaldehyde Absorbent (B) | | | |
| Formaldehyde Absorbing Material | 1-Thioglycerol 0.15 g | Acetanilide 0.15 g | Guanidine Sulfamide 0.15 g |
| Porous Material for Supporting | Powdery Activated Carbon 2.0 g | Sepiolite 2.0 g | Sepiolite 2.0 g |
| Gas Concentration in Sealed Container (Preservation: 20° C. 40% RH) | | | |
| Oxygen | 0.1% | 0.1% | 0.1% |
| Relative Humidity (20° C.) | 40% | 40% | 40% |
| Formaldehyde | N.D. | N.D. | N.D. |
| Acetaldehyde | N.D. | N.D. | N.D. |
| Acetic acid | N.D. | N.D. | N.D. |

TABLE 3

| | Example 13 | Example 14 | Example 15 |
|---|---|---|---|
| Organic Oxygen Absorbent (A) | | | |
| Oxidizable Main Component | Soybean Oil Fatty Acid Iron 1.0 g | Soybean Oil Fatty Acid Iron 1.0 g | Soybean Oil Fatty Acid Iron 1.0 g |
| Oxygen Absorption Accelerator | — | — | — |
| Porous Material for Supporting Oxidizable Main Component | Diatomaceous Earth 2.0 g | Diatomaceous Earth 2.0 g | Diatomaceous Earth 2.0 g |
| Formaldehyde Absorbent (B) | | | |
| Formaldehyde Absorbing Material | Melamine 0.12 g | Thiosalicylic Acid 0.15 g | Sulfolane 0.15 g |
| Porous Material for Supporting | Diatomaceous Earth 5.0 g | Diatomaceous Earth 1.0 g | Diatomaceous Earth 1.0 g |
| Carbon Dioxide Gas Absorbent | — | — | — |
| Other Additive | — | — | — |
| Gas Concentration in Sealed Container (Preservation: 20° C. 40% RH) | | | |
| Oxygen | 0.1% | 0.1% | 0.1% |
| Relative Humidity | 40% | 40% | 40% |
| Carbon Dioxide Gas | — | — | — |
| Formaldehyde | N.D. | N.D. | N.D. |
| Acetaldehyde | N.D. | N.D. | N.D. |
| Acetic acid | N.D. | N.D. | N.D. |
| | Example 16 | Example 17 | Example 18 |
| Organic Oxygen Absorbent (A) | | | |
| Oxidizable Main Component | Soybean Oil Fatty Acid Iron 1.0 g | Soybean Oil Fatty Acid Iron 1.0 g | Soybean Oil Fatty Acid Iron 1.0 g |
| Oxygen Absorption Accelerator | — | — | — |
| Porous Material for Supporting Oxidizable Main Component | Diatomaceous Earth 2.0 g | Diatomaceous Earth 2.0 q | Diatomaceous Earth 2.0 g |
| Formaldehyde Absorbent (B) | | | |
| Formaldehyde Absorbing Material | Sulfamic Acid 0.15 g | Sodium Sulfanilate 0.15 g | Sodium Sulfanilate 0.15 g |
| Porous Material for Supporting | Sepiolite 2.0 g | Sepiolite 2.0 g | Sepiolite 2.0 g |
| Carbon Dioxide Gas Absorbent | — | Cu(OH)$_2$ 0.5 g | Ca(OH)$_2$ 0.5 g |
| Other Additive | — | — | Granular Activated Carbon 0.5 g |
| Gas Concentration in Sealed Container (Preservation: 20° C. 40% RH) | | | |
| Oxygen | 0.1% | 0.1% | 0.1% |
| Relative Humidity (20° C.) | 40% | 40% | 40% |
| Carbon Dioxide Gas | — | N.D. | N.D. |
| Formaldehyde | N.D. | N.D. | N.D. |
| Acetaldehyde | N.D. | N.D. | N.D. |
| Acetic acid | N.D. | N.D. | N.D. |

TABLE 4

| | Comp. Ex. 1 | Comp. Ex. 2 | Comp. Ex. 3 |
|---|---|---|---|
| Organic Oxygen Absorbent (A) | | | |
| Oxidizable Main Component | Reducing Iron Powder 1.0 g | Reducing Iron Powder 1.0 g | Soybean Oil Fatty Acid Iron 1.0 g |
| Oxygen Absorption Accelerator | 20% Aqueous NaCl Solution 1.2 g | — | — |
| Porous Material for Supporting Oxidizable Main Component | — | — | CaO 3.0 g |
| Formaldehyde Absorbent (B) | | | |
| Formaldehyde Absorbing Material | — | — | — |
| Porous Material for Supporting | — | — | — |
| Other Additives | Powdery Activated Carbon 1.0 g | Powdery Activated Carbon 1.0 g | — |
| Gas Concentration in Sealed Container (Preservation: 20° C. 40% RH) | | | |
| Oxygen | 0.1% | 15% | 0.1% |
| Relative Humidity (20° C.) | 75% | 15% | 3% |
| Formaldehyde | — | — | 5 ppm |
| Acetaldehyde | — | — | 500 ppm |
| Acetic acid | — | — | 6 ppm |
| | Comp. Ex. 4 | Comp. Ex. 5 | Comp. Ex. 6 |
| Organic Oxygen Absorbent (A) | | | |
| Oxidizable Main Component | Soybean Oil Fatty Acid Iron 1.0 g | Soybean Oil Fatty Acid Iron 1.0 g | Soybean Oil Fatty Acid Iron 1.0 g |
| Oxygen Absorption Accelerator | — | — | — |
| Porous Material for Supporting Main Component | Zeolite 3.0 g | Granular Activated Carbon 3.0 g | CaO 3.0 g |
| Formaldehyde Absorbent (B) | | | |
| Formaldehyde Absorbing Material | — | — | — |
| Porous Material for Supporting | — | — | — |
| Other Additives | — | — | Glycerin: 0.46 g Water: 0.04 g Silica Gel: 1.5 g |
| Gas Concentration in Sealed Container (Preservation: 20° C. 40% RH) | | | |
| Oxygen | 0.1% | 18% | 0.1% |

TABLE 4-continued

| | | | |
|---|---|---|---|
| Relative Humidity (20° C.) | 20% | — | 35% |
| Formaldehyde | 5 ppm | — | 5 ppm |
| Acetaldehyde | 500 ppm | — | 500 ppm |
| Acetic acid | 6 ppm | — | 6 ppm |

TABLE 5

| | Comp. Ex. 7 | Comp. Ex. 8 | Comp. Ex. 9 |
|---|---|---|---|
| Organic Oxygen Absorbent (A) | | | |
| Oxidizable Main Component | Soybean Oil Fatty Acid Iron 1.0 g | Soybean Oil Fatty Acid Iron 1.0 g | Soybean Oil Fatty Acid Iron 1.0 g |
| Oxygen Absorption Accelerator | — | — | — |
| Porous Material for Supporting Oxidizable Main Component | CaO 3.0 g | CaO 3.0 g | CaO 3.0 g |
| Formaldehyde Absorbent (B) | | | |
| Formaldehyde Absorbing Material | Activated Carbon 2.0 g | Zeolite 2.0 g | MgO 2.0 g |
| Porous Material for Supporting | — | — | — |
| Other Additives | Glycerin: 0.46 g Water: 0.04 g Silica Gel: 1.5 g | Glycerin: 0.46 g Water: 0.04 g Silica Gel: 1.5 g | Glycerin: 0.46 g Water: 0.04 g Silica Gel: 1.5 g |
| Gas Concentration in Sealed Container (Preservation: 20° C. 40% RH) | | | |
| Oxygen | 0.1% | 0.1% | 0.1% |
| Relative Humidity (20° C.) | 35% | 35% | 35% |
| Formaldehyde | 3 ppm | 5 ppm | 5 ppm |
| Acetaldehyde | 50 ppm | 500 ppm | 500 ppm |
| Acetic acid | 5 ppm | 6 ppm | 6 ppm |

| | Comp. Ex. 10 | Comp. Ex. 11 |
|---|---|---|
| Organic Oxygen Absorbent (A) | | |
| Oxidizable Main Component | Soybean Oil Fatty Acid Iron 1.0 g | Soybean Oil Fatty Acid Iron 1.0 g |
| Oxygen Absorption Accelerator | — | — |
| Porous Material for Supporting Oxidizable Main Component | CaO 3.0 g | CaO 3.0 g |
| Formaldehyde Absorbent (B) | | |
| Formaldehyde Absorbing Material | CaO 2.0 g | Ca(OH)$_2$ 2.0 g |
| Porous Material for Supporting | — | — |
| Other Additives | Glycerin: 0.46 g Water: 0.04 g Silica Gel: 1.5 g | Glycerin: 0.46 g Water: 0.04 g Silica Gel: 1.5 g |
| Gas Concentration in Sealed Container (Preservation: 20° C. 40% RH) | | |
| Oxygen | 0.1% | 0.1% |
| Relative Humidity (20° C.) | 35% | 35% |
| Formaldehyde | 5 ppm | 5 ppm |
| Acetaldehyde | 500 ppm | 500 ppm |
| Acetic acid | 6 ppm | 6 ppm |

| | Comp. Ex. 12 | Comp. Ex. 13 |
|---|---|---|
| Organic Oxygen Absorbent (A) | | |
| Oxidizable Main Component | Soybean Oil Fatty Acid Iron 1.0 g | Soybean Oil Fatty Acid Iron 1.0 g |
| Oxygen Absorption Accelerator | — | — |
| Porous Material for Supporting Oxidizable Main Component | CaO 3.0 g | Diatomaceous Earth 2.0 g |
| Formaldehyde Absorbing Material | Melamine 2.0 g | — |
| Porous Material for Supporting | — | — |
| Other Additives | Glycerin: 0.46 g Water: 0.04 g Silica Gel: 1.5 g | — |
| Gas Concentration in Sealed Container (Preservation: 20° C. 40% RH) | | |
| Oxygen | 0.1% | 0.1% |
| Relative Humidity (20° C.) | 35% | 40% |
| Formaldehyde | 5 ppm | 5 ppm |
| Acetaldehyde | 500 ppm | 500 ppm |
| Acetic acid | 6 ppm | 6 ppm |

What is claimed is:

1. An oxygen absorbent composition comprising an organic oxygen absorbent (A) which neither absorbs nor releases moisture and in which an oxidizable main component is supported on a porous silicate having an average pore diameter of 200 to 5,000 Å, and a formaldehyde absorbent (B) which neither absorbs nor releases moisture and is at least one of an amine, a thiol and a sulfonic acid that is supported on a porous carrier.

2. The composition according to claim 1 wherein an oxidizable main component of the organic oxygen absorbent (A) is at least one selected from unsaturated fatty acid compounds and chain hydrocarbon polymers having an unsaturated group.

3. The composition according to claim 1 wherein the porous silicate having an average pore diameter of 200 to 5,000 Å is at least one selected from the group consisting of diatomaceous earth, Kanuma soil and sepiolite.

4. The composition according to claim 1 wherein the porous carrier for formaldehyde absorbent (B) is a porous silicate having an average pore diameter of 200 to 5,000 Å.

5. The composition according to claim 1 wherein the porous silicate carrier for formaldehyde absorbent (B) having an average pore diameter of 200 to 5,000 Å is at least one selected from the group consisting of diatomaceous earth, Kanuma soil and sepiolite.

6. The composition according to claim 1 wherein the porous carrier for formaldehyde absorbent (B) is activated carbon.

7. The composition according to claim 1 wherein the amine, the thiol or the sulfonic acid is solid at −10° C. to 50° C.

8. The composition according to claim 7 wherein the amine, the thiol or the sulfonic acid is at least one selected from the group consisting of 2-amino-5-methylbenzenesulfonic acid, m-aminobenzenesulfonic acid, 4-amino-2-chlorotoluene-5-sulfonic acid, 1-naphthylamine-4-sulfonic acid, 2-aminonaphthalene-1-sulfonic acid, 4-aminobenzenesulfonic acid, 3-amino-6-chlorotoluene-4-sulfonic acid, 7-hydroxynaphthalenesulfonic acid, 2-amino-5-naphthol-7-sulfonic acid, 6-amino-4-hydroxy-2-naphthalenesulfonic acid, and 4-amino-5-hydroxy-2,7-naphthalenesulfonic acid which have both of an amino group and a sulfonic group in a molecule, and cystine having both of the amino group and a mercapto group.

* * * * *